Figure 1:
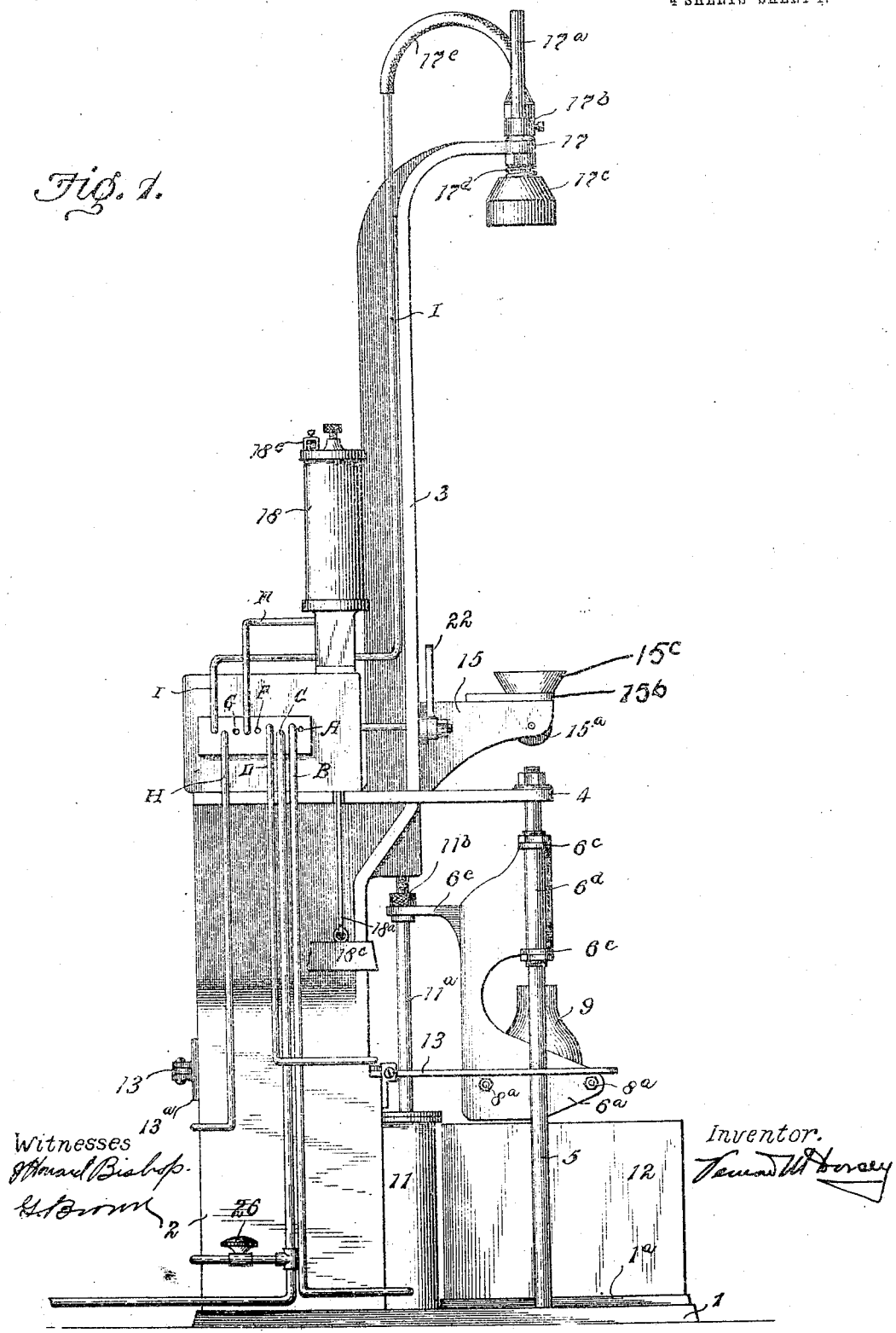

V. M. DORSEY.
GLASS BLOWING MACHINE.
APPLICATION FILED JUNE 30, 1908. RENEWED MAY 31, 1912.

1,052,902.

Patented Feb. 11, 1913.
4 SHEETS—SHEET 1.

Witnesses
Inventor.

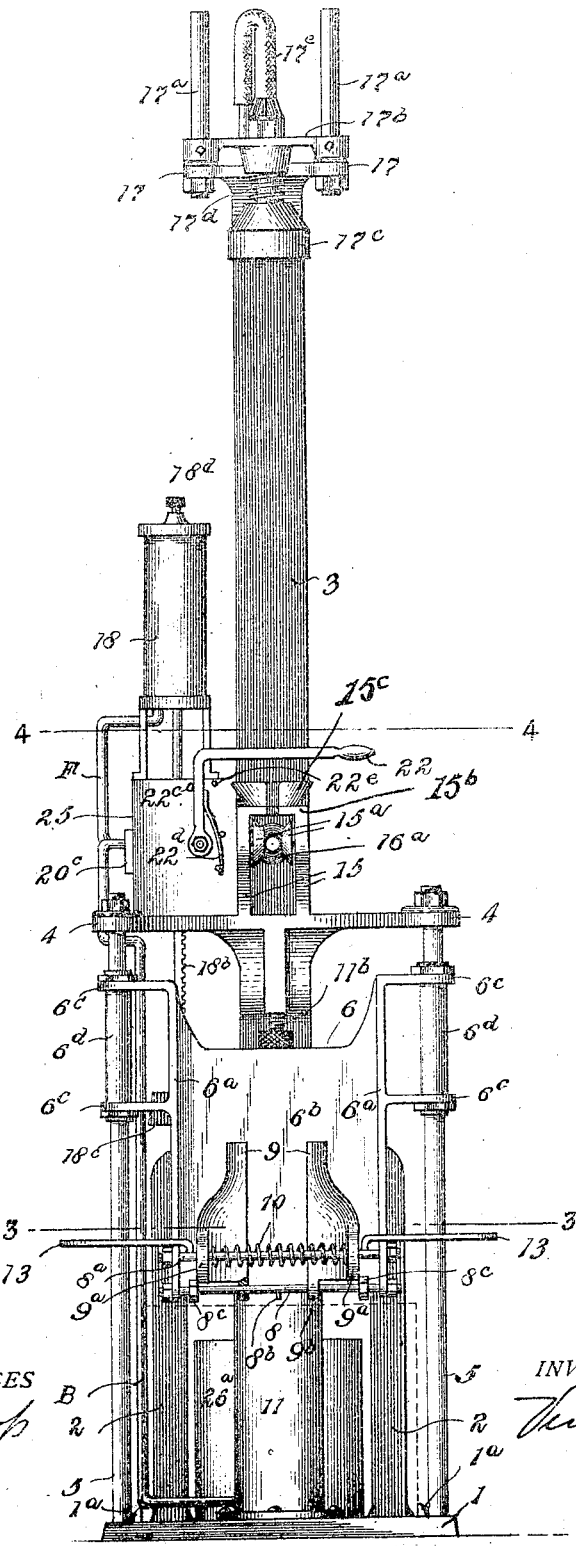

V. M. DORSEY.
GLASS BLOWING MACHINE.
APPLICATION FILED JUNE 30, 1908. RENEWED MAY 31, 1912.
1,052,902.
Patented Feb. 11, 1913.
4 SHEETS—SHEET 3.
Fig. 5.
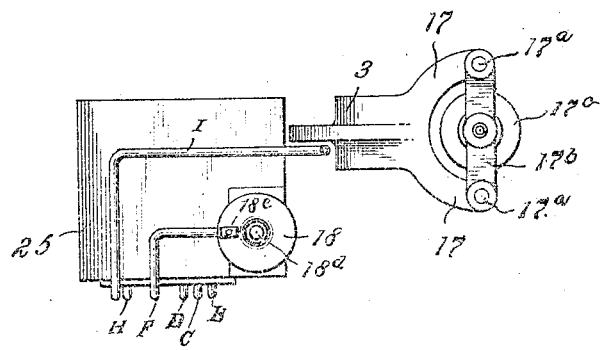
Fig. 4.
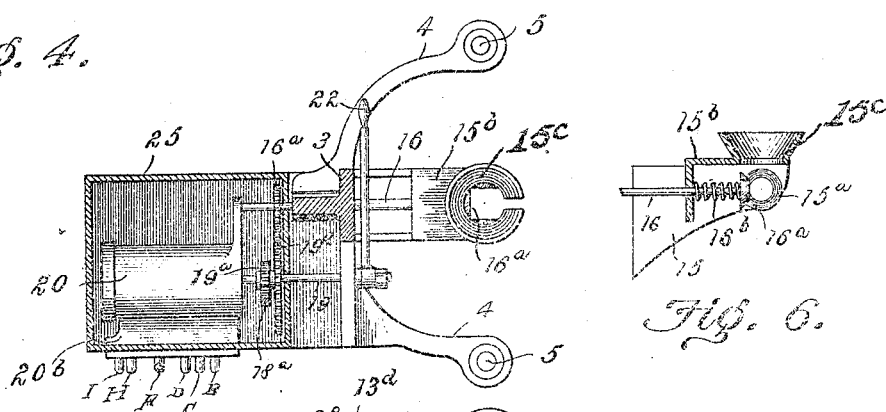
Fig. 6.
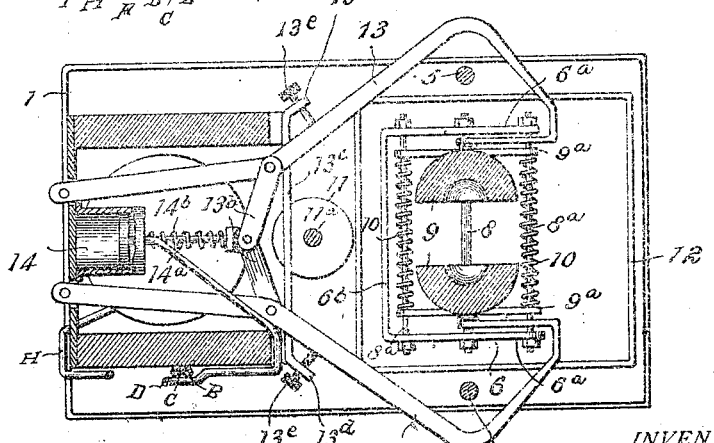
Fig. 3.
WITNESSES
INVENTOR

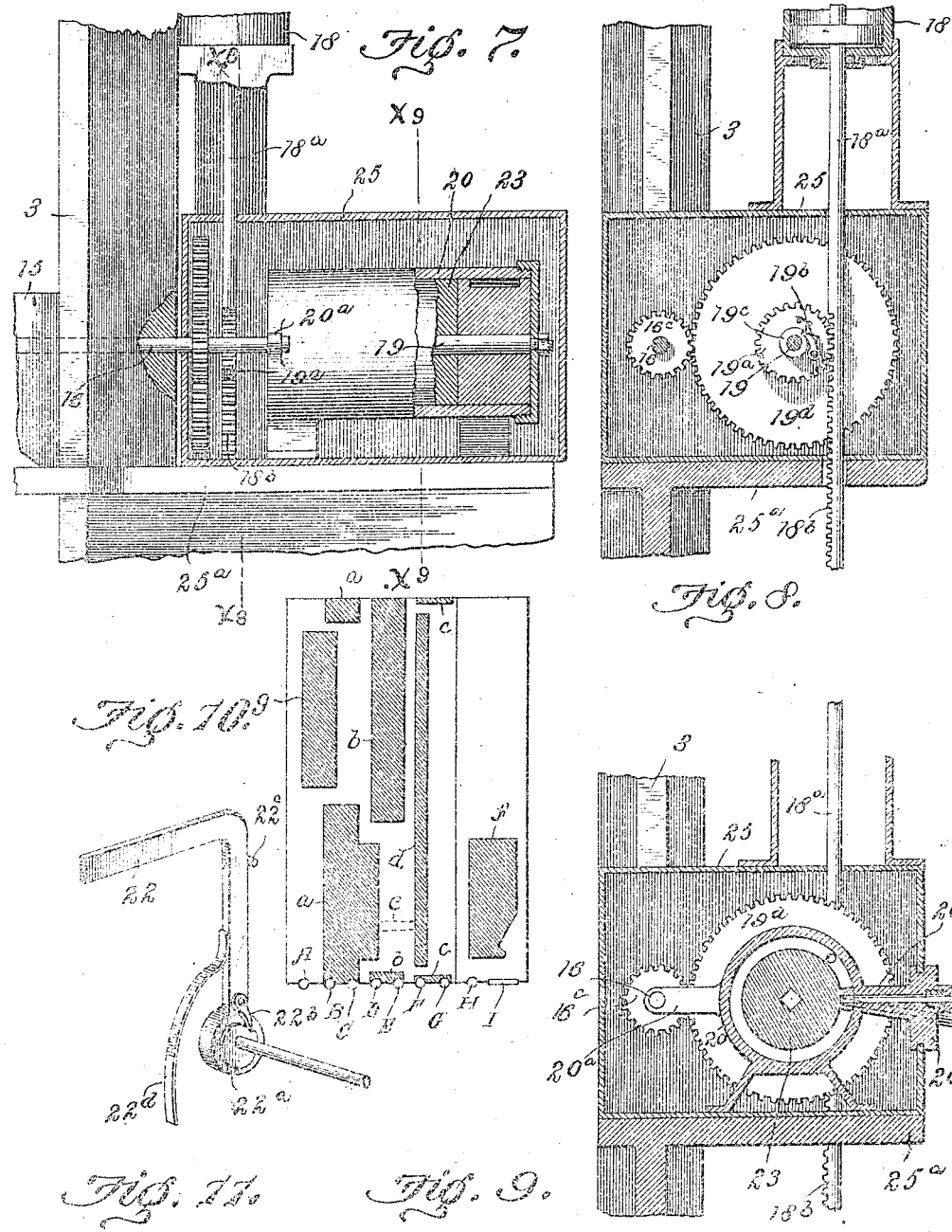

UNITED STATES PATENT OFFICE.

VERNON M. DORSEY, OF LAUREL GROVE, MARYLAND, ASSIGNOR TO EMPIRE MACHINE COMPANY, OF PORTLAND, MAINE, A CORPORATION OF MAINE.

GLASS-BLOWING MACHINE.

1,052,902.   Specification of Letters Patent.   Patented Feb. 11, 1913.

Application filed June 30, 1908, Serial No. 441,055. Renewed May 31, 1912. Serial No. 700,802.

*To all whom it may concern:*

Be it known that I, VERNON M. DORSEY, a citizen of the United States of America, and a resident of Laurel Grove, St. Marys county, State of Maryland, have invented certain new and useful Improvements in Glass-Blowing Machines, of which the following is a specification.

My invention relates to a machine for performing certain operations attendant upon the production of blown glass articles. In the usual processes employed for the production of such articles a suitable quantity of glass having been gathered upon the end of a blow-pipe, it receives a preliminary shaping by marvering or swinging, and is then inserted in a separable mold, which is closed thereon, and is blown while located within the mold, by admitting air to the interior thereof, rotation being simultaneously imparted to the blow-pipe or mold in respect to each other for the purpose of eliminating the impression which would otherwise be made by the joint of the mold.

This machine is characterized by the utilization of independent prime motors for moving the mold parts in respect to each (opening or closing the mold), and for moving the mold as a whole, (immersing or lifting the molds,) which motors are independent of and separate from the motive power of those parts situated in the head of the machine, namely, the blow-pipe rotating and blow-air controlling mechanism, thereby dispensing with much complex transmitting mechanism which must necessarily be employed where the several parts are driven from a single prime actuator and power is transmitted from the base of the machine to the head or vice versa. This complexity is especially marked by reason of the fact that in glass-blowing machines, the several parts are called upon to operate at different times. Thus the molds cannot be closed until they are raised to blowing position and cannot be lowered until they are opened, this necessitating when a single actuator is employed for both of these movements, intermittent driving devices therefor. Furthermore, glass factories are necessarily equipped with air pressure to urge the combustion of the furnaces and by utilizing independent air motors power may be taken directly from the air system, and as the required movement is limited, the motors may take the form of simple cylinders with inclosed pistons, which perform their full operation at a single stroke. Again the mold closing and lifting mechanism requires that the parts be accurately positioned and free of vibration at rest, a matter difficult to accomplish with mechanical gearing, but to which pistons directly connected to the several parts lend themselves, by reason of the elasticity of air. The machine here designed performs its several operations therefore by means of simple air cylinders and inclosed pistons, and in it the mechanism for guiding molds in lifting and lowering, which determines their alinement with the blow-pipe, is not in any way subject to the wear and corrosive action of the cooling liquid but is outside of the cooling tank, which may be removed and readily replaced without disconnecting the machines in any way.

Referring to the accompanying drawings, in which corresponding parts are designated by corresponding marks of reference:—Figure 1 is a side elevation of a machine constructed in accordance with this invention. Fig. 2 is a front elevation thereof. Fig. 3 is a longitudinal section on lines $x^3$ $x^3$ of Figs. 1 and 2. Fig. 4 is a horizontal section on lines $x^4$ $x^4$ of Figs. 1 and 2. Fig. 5 is a plan elevation of the head. Fig. 6 is a longitudinal vertical section of the blow-pipe socket. Fig. 7 is a detail, vertical longitudinal section through the valve mechanism. Figs. 8 and 9 are transverse sections on lines $x^8$ $x^8$ and $x^9$ $x^9$ thereof, respectively. Fig. 10 is a development of the valve cylinder. Fig. 11 is a detached perspective of the starting lever.

The several parts of the machine are carried by a single unitary casting comprising a base 1, from the rear of which rises a standard having bifurcated lower portions 2, such portions uniting into a single T shaped upper portion 3 which extends to near the top of the machine.

The standard has intermediate of its height bifurcated arms 4 projecting from the front thereof forward to each side of its center line, which receive the upper end of the vertical guide rods 5, the lower ends of which are held by the base of the casting. A suitable mold support 6, consisting of side webs $6^a$, connected by a rear web $6^b$, is located between these rods and is guided thereon by means of ears $6^c$, the ears on the same side being preferably connected by brasses 6ᵈ mounted upon the said rods and sliding thereon, the lower ears 6ᵉ projecting from the sides of the support above the bottom thereof. At the bottom the sides of the support are connected by three transverse guide rods 8, 8ᵃ and 8ᵃ, the rod 8 being located below and between the two rods 8ᵃ.

The mold is made in two parts 9, each part having projecting from its side ears 9ᵃ sliding upon the rods 8ᵃ and the bottom ear 9ᵇ sliding upon the rod 8, the last named rod having a central pin 8ᵇ adapted by contacting with the bottom ears on the mold sections to limit the inward or central movement of the same. The mold sections are normally held apart by means of springs 10 mounted on the rods 8ᵃ between the side ears on the mold sections, the outward movement of the sections being limited by adjustable nuts 8ᶜ upon the lower rod 8.

Attached to the rear web of the mold support is the bracket 6ᵉ receiving the upper end of a piston rod 11ᵃ, the lower end of which moves in a vertical cylinder 11 so that upon admission of air to the lower end of the said cylinder, the piston and with it the mold support will be raised. When the support is lowered the molds carried thereon drop into a suitable removable tank 12 which rests upon the base 1 between the vertical guide rods 5 and in front of the cylinder 11, the tank being guided by flanges 1ᵃ cast upon the base. When the piston is raised within the cylinder the mold sections are lifted clear of the water in the tank and to such height that the tank may be removed and replaced.

The upward movement of the mold support may be adjusted and determined by means of a set screw 11ᵇ located above the piston and taking into a lug projecting from the standard.

A cross bar 13ᵃ located across the rear of the bifurcated legs of the standard serves as a pivotal support for the mold closing levers 13, the forward ends of which are bent outwardly and around the vertical guide rods and extend sufficiently far in front thereof to enter the mold carrying support from the front and on the inside of the side webs thereof and between the same and mold sections when opened. These levers have their forward ends bent downwardly so that they may engage the mold sections at about the level of the horizontal guide rods 8ᵃ and thus apply pressure to close the molds in the same plane as are located the springs tending to open the same. The closing levers are connected together by means of the toggle links 13ᵇ which in turn have their common pivotal point connected to the forward end of a piston rod 14ᵃ, the rear end of which carries a piston head located in a horizontal cylinder 14 mounted on a cross bar 13ᵃ and within the bifurcated legs, so that upon the admission of air to the forward end of this cylinder, the joint of the toggles will be drawn back and thus the mold closing levers drawn together. The toggle joint is however driven by means of a spring 14ᵇ interposed between the head of the cylinder and a shoulder on the piston rod, thus opening the forward end of the levers 13 to an extent sufficient to position them between the sides of the mold and the side webs of the carrier. The levers are carried and guided horizontally by means of a bar 13ᶜ, located in front of and carried by the bifurcated legs of the casting, which plate has bifurcated brackets 13ᵈ formed on the end thereof to receive adjusting screws 13ᵉ by which the open position of the closing levers may be accurately determined.

The main casing has projecting from the front web of its upper T shaped portion intermediate of its height, brackets 15 in which are trunnioned conical friction pulleys 15ᵃ adapted to receive between them a flanged removable blow-pipe, the flange upon the blow-pipe resting upon the said rollers. To permit the ready insertion of the latter a plate 15ᵇ provided with a conical socket 15ᶜ is mounted upon the upper edges of the bracket, the socket being vertically slotted at the front. The rear end of the plate 15ᵇ is bent down, forming a bearing for a horizontal shaft 16, carrying upon its forward end a conical drive pulley 16ᵃ interposed between the bearing pulleys 15ᵃ and projected between and upon them by means of a spiral spring 16ᵇ. The shaft is given rotation by mechanism to be hereinafter described and thereby rotates the blow-pipes in respect to the molds.

The upper end of the standard of the casting extends forwardly in bifurcated arms 17 adapted to receive the lower ends of vertical guide rods 17ᵃ, which carry an adjustable cross head 17ᵇ, in which is mounted a vertically movable blow-head 17ᶜ normally held to its lower limit by a spiral spring 17ᵈ and adapted to receive the upper end of the blow-pipe when inserted therein, the spring seating the blow-head upon the blow-pipe. The cross head is adjustable in the vertical guides to accommodate variations in height of the upper ends of the blow-pipes caused by variation in height of the molds and of the variation in length of the blow-pipes, and to permit this adjustment of the height of the blow-head, it is connected by a flexible pipe 17ᵉ with a suitable air valve to be hereinafter described.

The admission of air to the mold lifting cylinder, to the mold closing cylinder, to the air head, and to the air driven mechanism to rotate the blow-pipe is controlled by means of a rotary valve driven by means of a suitable motor, preferably in the form of a cylinder and its piston and for convenience and economy, I prefer to cause the same motor to drive the horizontal shaft 16 and thus rotate the blow-pipe. This motor causes a movement of the valve through a complete cycle and restores it to its initial position and the details thereof are represented in Figs. 7 to 11. As shown, a cylinder 18 mounted upon and adjacent to the machine has the lower part of its piston 18$^a$ provided with a suitable series of rack teeth 18$^b$ engaging the pinion 19$^a$ loosely mounted on a horizontal shaft 19, the piston by means of a spring click 19$^b$ and ratchet wheel 19$^c$, fast upon the shaft, driving the latter when the piston is moved upwardly within the cylinder, the click permitting the piston to descend within the cylinder without rotation of the shaft, and for the purpose of causing this descent of the piston, a suitable weight 18$^c$ is hung thereon. The piston is moved upwardly within the cylinder by means of air admitted to the lower end thereof, its movement in this direction being retarded by forming the upper part of the cylinder 18 into a dash pot provided with a suitable controllable escape aperture 18$^d$ by which the upward movement of the piston therein can be regulated, a suitable valve 18$^e$ being employed to admit air into the upper end of the cylinder forming the dash pot to permit the rapid descent of the piston therein under the weight.

The shaft 19 extends through a suitable valve casing 20, which is provided with a projecting arm 20$^a$, in which is mounted the rear end of the horizontal blow-pipe revolving shaft 16 which has thereon a pinion 16$^c$ gearing with a wheel 19$^d$ upon the shaft 19 and driven thereby. The valve shaft 19 continues forwardly through the valve casing and through the front web of the main casting and has upon its forward end a ratchet 22$^a$ and a loosely mounted hand lever 22, the lever being adjacent to the ratchet and carrying a spring pawl 22$^b$ adapted to engage the latter. The handle is normally held against a pin 22$^c$ by a spring 22$^d$, its downward movement in response to the hand of the operator being limited by a pin 22$^e$.

Within the valve casing 20 is a valve cylinder 23 which is locked for rotation to the valve shaft 19 in any suitable manner, the valve casing having on one side a projecting web 20$^b$, in which are bored a series of apertures in two planes, the inner end of the apertures being all located however in the same horizontal line, while a correspondingly perforated air distributing plate 20$^c$ is adapted to be removably secured upon the face of the web, and has attached thereto ends of several air distributing pipes whereby the necessity of individually uncoupling the distributing pipes or disconnecting the valve casing is obviated. The apertures in the web are in the following order: The aperture A which has no pipe connection merely forms an exhaust: the aperture B (and pipe connection) for the lower end of the mold lifting cylinder: the aperture (and pipe connection) C to a main source of air under pressure: the aperture (and pipe connection) D to the mold closing cylinder, the exhaust aperture E having no pipe connection: the aperture (and pipe connection) F to the lower end of the valve cylinder 18: the exhaust aperture G having no pipe connection: the aperture (and pipe connection) H to a source of blowing air pressure and the aperture (and pipe connection) I to the flexible pipe 17$^e$ attached to the air head. The valve cylinder 23 contained within the casing has a series of depressions therein and its development is diagrammatically illustrated in Fig. 10. In its normal position the depression $a$ therein connects the aperture and pipe connection C to the air supply with the aperture and pipe connection B to the mold lifting cylinder, and thereby holds the cylinder at the upper limit of its movement, the depression $b$ therein connects the aperture (and pipe connection) D to the mold cylinder with the exhaust aperture F and the depression $c$ connects aperture (and pipe connection) F to the valve cylinder, with the exhaust aperture G, so that the valve piston 18$^a$ is at its lower limit of movement.

In the operation of the machine, the workman, having gathered a suitable mass of glass upon a blow-pipe inserts the upper end of the same in the air head and the intermediate part thereof within the socket and then gives a slight downward movement to the lever 22 which rotates the valve shaft 19 through a similar part of its travel, the rotation thus given being however sufficient to bring the depression $d$ opposite the aperture (and pipe connection) F to the valve cylinder, this depression being connected to the depression $a$ which at the time stated is in connection with the main air pipe aperture C by a covered passage way $e$ which may be drilled into the valve plug whereby air will be admitted to the lower part of the valve cylinder and the piston therein forced upwardly with a speed dependent upon the adjustment of the relief valve 18$^d$, thereby rotating the shaft 19 and all parts attached thereto, the lever however not partaking of this movement by reason of its ratchet connection 22$^a$. Upon the release of the hand lever it is returned to normal position by its spring 22$^d$, the combined rotation of the valve shaft by means of its air motor, meanwhile not only rotates the blow-pipe through the gearing 16$^c$ and 19$^d$, but also rotates the valve cylinder to successively and in proper order bring the several instrumentalities into action. Thus the aperture (and pipe connection) D to the mold closing cylinders are disconnected from their exhaust E and are connected by the depression *a* with the air supply aperture C, thus closing the molds and at a proper time the supplemental blow air supply aperture H is brought by the depression *f* into connection with the blow head aperture (and pipe connection) I, while the subsequent rotation of the valve by means of the motor will cut off the air supply through the aperture D to the mold closing cylinder and will by means of the depression *b* bring the same into connection with the exhaust aperture E permitting the molds to open. Further rotation will cut off the air supply through the aperture (and pipe connection) B to the mold lifting cylinder and by depression *g* connect them with the exhaust aperture A, permitting the molds to descend and will finally after closing the exhaust A, connect by means of the depression *a* the air supply aperture (and pipe connection) C to the mold lifting cylinder, whereby the mold will be lifted and will after closing the aperture (and pipe connection) F to the valve cylinder connect that aperture with its exhaust G whereby the weight or other reversing means will restore the piston 18ᵃ to normal position, without however rotating the valve. During this rotation of the valve, the several cylinders connected with the molds will have performed their operation in their predetermined order and air will have been admitted to the blow head in a manner and for a time determined by the depression *f* and for the purpose of permitting a better graduation of the pressure within the air head, the aperture I connected therewith is elongated as shown in Fig. 10. The movement of the piston within the cylinder will cause a complete rotation of the valve and of the valve shaft, whereby all parts thereof will be restored to normal position, whereby the mold which was dropped into the tank during the rotation of the valve, will after a certain time, dependent upon the speed of travel of the valve be lifted therefrom, the return of the mold to the normal position taking place while the valve is stationary. As soon as the mold has been returned, the operation will be completed. To permit variation in the timing of the blow supply, that part of the valve plug which controls the air for this blowing may be formed separately from the other part thereof, so as to be readily removed and a differently shaped section substituted therefor, while for the purpose of protecting the valve parts from dust the valve casting is preferably contained within a box 25 carried upon a table 25ᵃ, on the casting, it in turn carrying upon its top the valve cylinder 18.

The air for blowing may be derived from the main air supply of the factory through the interposition of a pressure reducing valve 26 located between such air supply and an air equalizing box 26ᵃ located in the bifurcated portion of the standard and provided with a blow off valve.

Having thus described my invention, what I claim and desire to secure by Letters Patent is:—

1. In a glass blowing machine, the combination with pneumatically operated mold lifting means, of pneumatically operated mold closing means, of a pneumatically actuated shaft controlling the air connections of the mold closing and mold lifting mechanisms and of its own actuating mechanism, substantially as described.

2. In a glass blowing machine, the combination with pneumatically operated mold lifting mechanism, of pneumatically operated mold closing mechanism, an air valve, a pneumatic motor for the said valve, manually actuated means for rotating the said valve to energize its motor and means whereby the actuation of the valve by its motor controls the air supply of the mold lifting and mold closing mechanism and stops the valve, substantially as described.

3. In a glass blowing machine, the combination of the separably vertically movable mold, an air motor raising the said mold, an air motor for closing the said mold, an air valve controlling the air supply and exhaust to the said mold closing and mold lifting motor, a motor for the said valve, whose air supply is controlled thereby, and means for initiating the movement of the said valve to energize its motor, substantially as described.

4. In a glass blowing machine, the combination with a separable vertically movable mold, an air motor for raising the said mold, an air motor for closing the said mold, an air head, an air valve controlling the admission of air to the said mold lifting and mold closing motors and to the air head, an air motor for the said valve, whose air supply is controlled thereby, and means for initiating the movement of the said valve, to energize its motor, substantially as described.

5. In a glass blowing machine, the combination with a separable vertically movable mold, an air motor for raising the said mold parts and an air motor for closing the same mold parts, means for supporting a blow-pipe in proximity to the mold and means for rotating the said blow-pipe, an air valve controlling the admission of air to the mold lifting and mold closing motors and a motor for actuating the said valve and the blow-pipe rotating means.

6. In a glass blowing machine, the combination with a vertically movable separable mold, an air motor for raising the said mold, an air motor for closing the mold when raised, an air head adapted to receive a blow-pipe, blow-pipe rotating devices adapted to support a blow-pipe in proximity to the mold, an air valve controlling the admission of air to the mold lifting and mold closing motors and to the blow-head, an air motor connected to the said valve and blow-pipe rotating means, whose air supply is controlled by the said valve, means for initiating the movement of the said valve to actuate its motor, means actuated by the valve for shutting off the flow of air to its motor and means for returning the motor to normal position.

7. In a glass blowing machine, the combination with a suitable base, guides arising therefrom, a cooling tank in proximity to the said guides, a mold support movable on the said guides and provided with depending side flanges connected by transverse guide rods, a separable mold, the parts of which are movable on the guide rods, means located on the exterior of the tank for lifting the said mold support and levers adapted to contact with the molds when raised to close the same, substantially as described.

8. In a glass blowing machine, the combination with a pneumatically operated mold lifting means, of pneumatically operated mold closing means, and a shaft controlling air admission and exhaust for the mold closing and mold lifting mechanism and controlling the air connections of its own actuating mechanism.

VERNON M. DORSEY.

Witnesses:
G. BROWN,
J. H. BISHOP.